United States Patent [19]

Sadarangani

[11] Patent Number: 5,155,404

[45] Date of Patent: Oct. 13, 1992

[54] SQUIRREL-CAGE INDUCTION MOTOR WITH ROTOR SLOT MAGNETIC BRIDGES

[75] Inventor: Chandur Sadarangani, Västerås, Sweden

[73] Assignee: Asea Brown Boveri, Västerås, Sweden

[21] Appl. No.: 671,847

[22] PCT Filed: Oct. 2, 1989

[86] PCT No.: PCT/SE89/00536

§ 371 Date: Apr. 12, 1991

§ 102(e) Date: Apr. 12, 1991

[87] PCT Pub. No.: WO90/04281

PCT Pub. Date: Apr. 19, 1990

[30] Foreign Application Priority Data

Oct. 14, 1988 [SE] Sweden ................... 8803665

[51] Int. Cl.⁵ .................. H02K 1/26; H02K 17/16; H02K 3/493
[52] U.S. Cl. .................. 310/211; 310/190; 310/214
[58] Field of Search ............... 310/125, 179, 190, 201, 310/210, 211, 212, 214, 216, 261, 264, 265, 166, 191, 197, 209

[56] References Cited

U.S. PATENT DOCUMENTS

| | | | |
|---|---|---|---|
| 2,067,605 | 1/1937 | Griffin | 310/211 |
| 2,794,138 | 5/1957 | Dunn, Jr. | 310/211 |
| 2,944,171 | 7/1960 | Alger | 310/211 |
| 4,139,790 | 2/1979 | Steen | 310/156 |
| 4,246,505 | 1/1981 | Yasaka et al. | 310/218 |
| 4,358,696 | 11/1982 | Liu et al. | 310/156 |
| 4,499,660 | 2/1985 | Lenz | 29/598 |
| 4,559,463 | 12/1985 | Kobayashi | 310/158 |
| 4,568,846 | 2/1986 | Kapadia | 310/156 |
| 4,782,260 | 11/1988 | Gandhi et al. | 310/216 |

FOREIGN PATENT DOCUMENTS 8106819-9 11/1981 Sweden.

Primary Examiner—Steven L. Stephan
Assistant Examiner—D. R. Haszko
Attorney, Agent, or Firm—Pollock, Vande Sande & Priddy

[57] ABSTRACT

A squirrel-cage induction motor for frequency converter operation includes a rotor which has a rotor core with a plurality of substantially axially extending rotor slots in which rotor conductors are arranged, each rotor slot having a main portion in which a rotor conductor is arranged and a slot opening arranged between the main portion and that surface of the rotor facing the air gap of the motor, and a magnetic bridge arranged to separate the slot opening from the main portion of the slot, wherein the ends of the magnetic bridge adjoin the rest of the rotor core on either side of the slot opening, and the portion of the bridge opposite to the ends extends into the main portion of the slot.

15 Claims, 5 Drawing Sheets

SQUIRREL-CAGE INDUCTION MOTOR WITH ROTOR SLOT MAGNETIC BRIDGES

TECHNICAL FIELD

The present invention relates to a squirrel-cage induction motor for frequency convertor operation comprising a rotor having a rotor core with a plurality of substantially axially extending rotor slots, in which rotor conductors are arranged, each rotor slot having a main portion in which a rotor conductor is arranged and a slot opening arranged between the main portion and that surface of the rotor which faces the air gap of the motor.

BACKGROUND ART

It is known that an asynchronous motor can be supplied from a static frequency convertor, for example for achieving a high speed of the motor or for making possible control of the speed of the motor. However, in frequency convertor operation additional losses harmonic losses, will arise because of harmonics in the motor current. By designing the motor so that its leakage reactance (short-circuit reactance) is high, a reduction of the harmonic currents, and hence of the additional losses, is obtained. However, an increase of the leakage reactance entails a reduction of the maximum torque of the motor and of its power factor, and it is therefore possible only to a limited extent to reduce the additional losses in this way.

From Swedish published patent application 433 995 it is known that the additional losses in an asynchronous motor supplied by a frequency convertor may be reduced by providing each winding bar with an axially extending channel facing the slot opening. However, this solution has several drawbacks. It is not possible to use it in rotor windings of a cast design. It gives a relatively low value of the differential leakage reactance of the motor and hence still relatively high harmonic currents and additional losses. In the solution mentioned it is not possible to effectively prevent the field in the vicinity of the slot opening from penetrating into the rotor conductor and generating additional losses there. Further, in this known solution it is the eddy currents in the rotor conductor that reduce the field penetrating into the conductor, and the effect achieved is therefore inseparably connected with a certain degree of additional losses.

SUMMARY OF THE INVENTION

The present invention aims to provide a motor of the kind described in the introductory part of the description, which a) makes it possible to use both cast rotor windings and bar windings,
b) exhibits considerably reduced additional losses, and
c) provides improved cooling of the rotor winding.

The above is achieved by providing the rotor core, according to the invention, with a magnetic bridge which separates the slot opening from the main portion of the slot, where the rotor conductor is arranged, and by giving the bridge a curved shape in the direction towards the rotor conductor.

As will be described more closely below, this provides a possibility of designing the rotor winding as a cast squirrel-cage winding, a considerable reduction of the additional losses of the motor and improved cooling of the rotor winding.

According to a preferred embodiment of the present invention, the bridge is provided with a recess, constituting an extension of the slot opening in the direction towards the interior of the rotor conductor. This results in an increase of the effective area exhibited by the slot opening for the leakage flux of the rotor conductor and hence an increase of the differential leakage reactance and a reduction of the harmonic currents and the additional losses.

Such recess is preferably designated as tapering from the slot opening in the direction of the rotor conductor and, in a similar manner, the width of the bridge tapers from the ends of the bridge towards the part thereof located centrally and directed towards the interior of the rotor conductor. This results in a very effective shielding of the leakage flux from the rotor conductor and, in addition, as linear a variation as possible of the leakage reactance of the rotor with the load of the motor, which for a given maximum leakage reactance gives a differential leakage reactance as high as possible at the working point and hence a very effective reduction of harmonic currents and of additional losses.

BRIEF DESCRIPTION OF THE DRAWING

The present invention will be described in the following with reference to the accompanying FIGS. 1-5, wherein.

DESCRIPTION OF THE PREFERRED EMBODIMENTS

Figure 1:
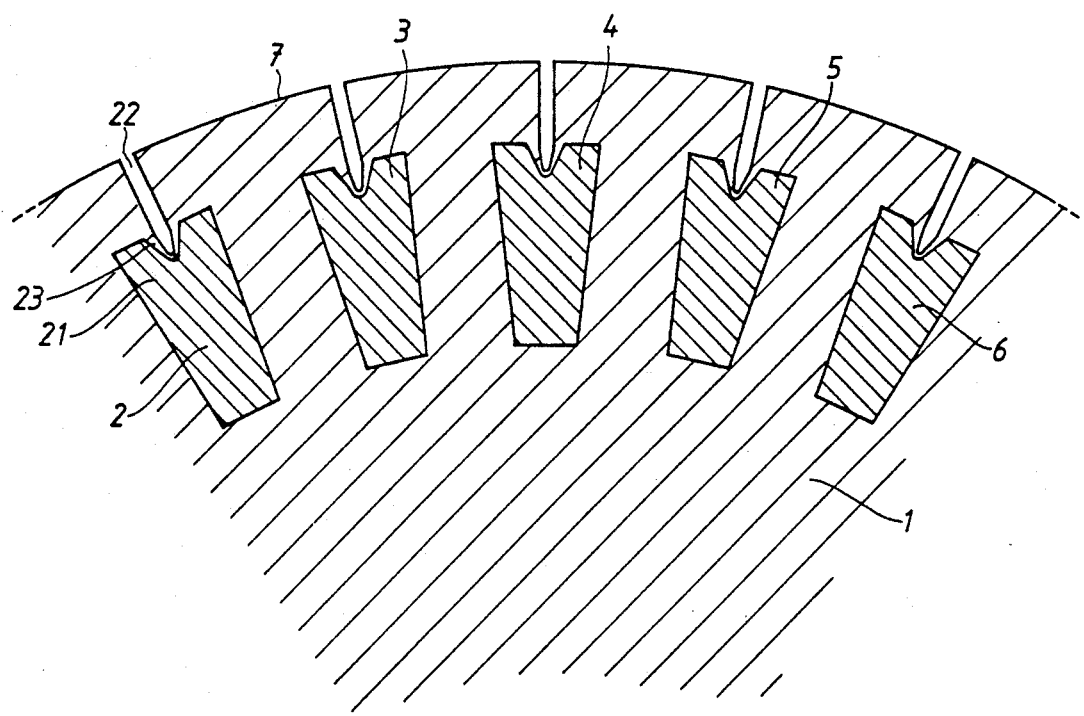
FIG. 1 shows part of a section through the rotor in a machine according to the invention.
Figure 2:
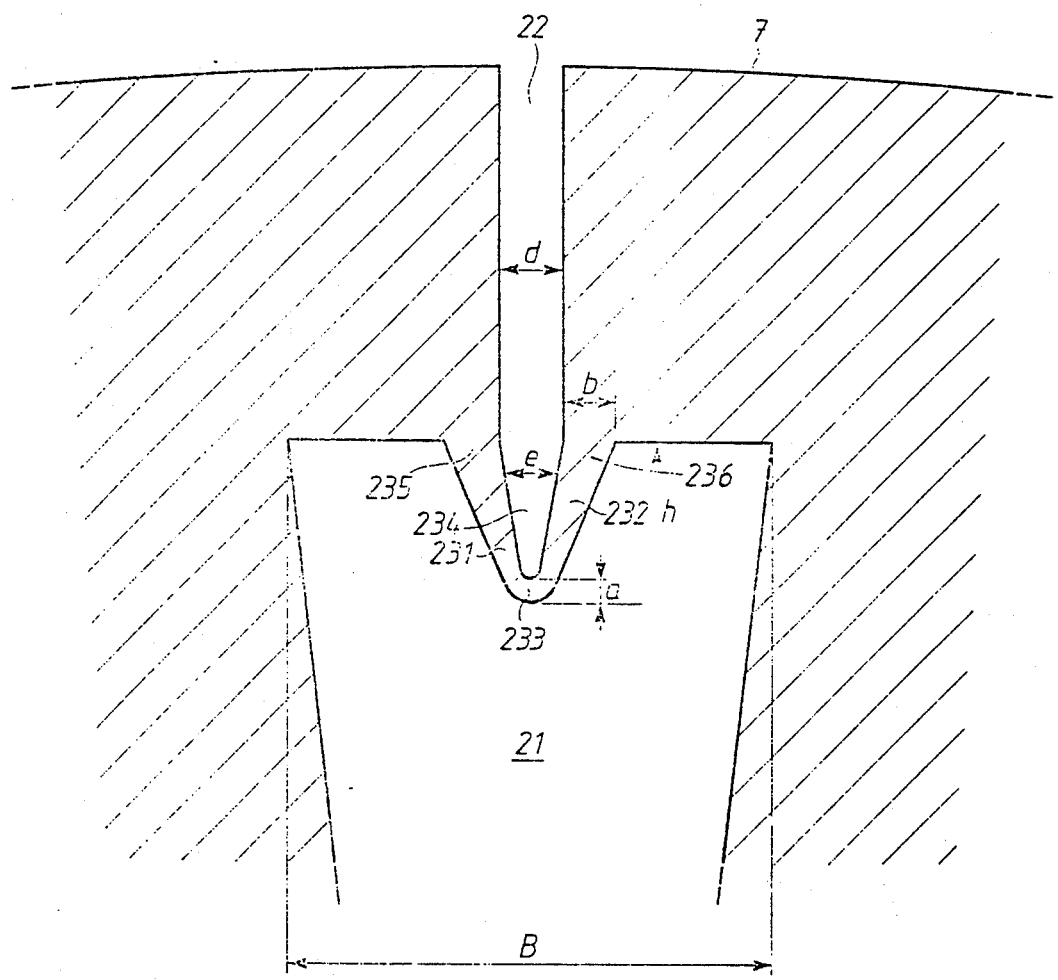
FIG. 2 shows in more detail the design of the rotor core at one of the slots in the rotor shown in FIG. 1.

FIGS. 1-4 show an example of a squirrel-cage induction motor according to the invention and its function. FIG. 1 shows part of a section through the rotor perpendicular to the axis of rotation of the rotor. The rotor core 1 is, as usual, built up as a package of sheets, the plane of which lies in the plane of the paper, i.e. perpendicular to the axis of rotation of the motor. The rotor is provided with a cast squirrel cage winding, of which rotor conductors 2-6 are shown in FIG. 1. The slots of the rotor are substantially identical, and in the following that slot in which the conductor 2 is arranged will be described. The slot has a main portion 21, into which conductor 2 is cast. Further, the slot has a slot opening 22 which is arranged, in a known manner, between the main portion 21 of the slot and that surface 7 of the rotor which faces the air gap and stator of the machine. A V-shaped bridge 23, which constitutes part of the rotor sheet section, adjoins the other parts of the rotor on either side of the slot opening 22 and has its tip directed towards the interior of the rotor conductor 2 (radially inwards towards the axis of rotation of the machine). FIG. 2 shows in more detail the design of the bridge 23. It has two branches 231, 232, which conform to the rest of the rotor sheet on either side of the slot opening 22 and which converge at a tip 233. The branches form between them an air gap (recess) 234. The width e of the recess nearest the slot opening 22 is equal to the width d of the slot opening 22 and decreases in a radially inward direction to a low value nearest the tip 233 of the bridge. Thus, between the branches 231 and 232 an air gap is formed which constitutes an extension of the slot opening 22 and which tapers off in a direction towards the interior of the rotor conductor. The two branches of the bridge have their largest width b nearest the slot opening, and their width decreases continuously radially inwardly to a low value a at the tip 233 of the bridge.

The bridge 23 as seen in the plane of the drawing has two ends 235, 236, which adjoin the rest of the rotor core 1 at both sides of the slot opening 22, and a central part 233, situated between the two ends. The central part 233 of the bridge is situated closer to the axis of the rotor than the ends 235, 236 of the bridge. The bridge surface facing the main portion 21 of the rotor slot, and thus facing the rotor conductor 2, is therefore convex or curved radially inward, that is, towards the interior of the main slot portion 21 and thus towards the rotor conductor 2.

Figure 3:
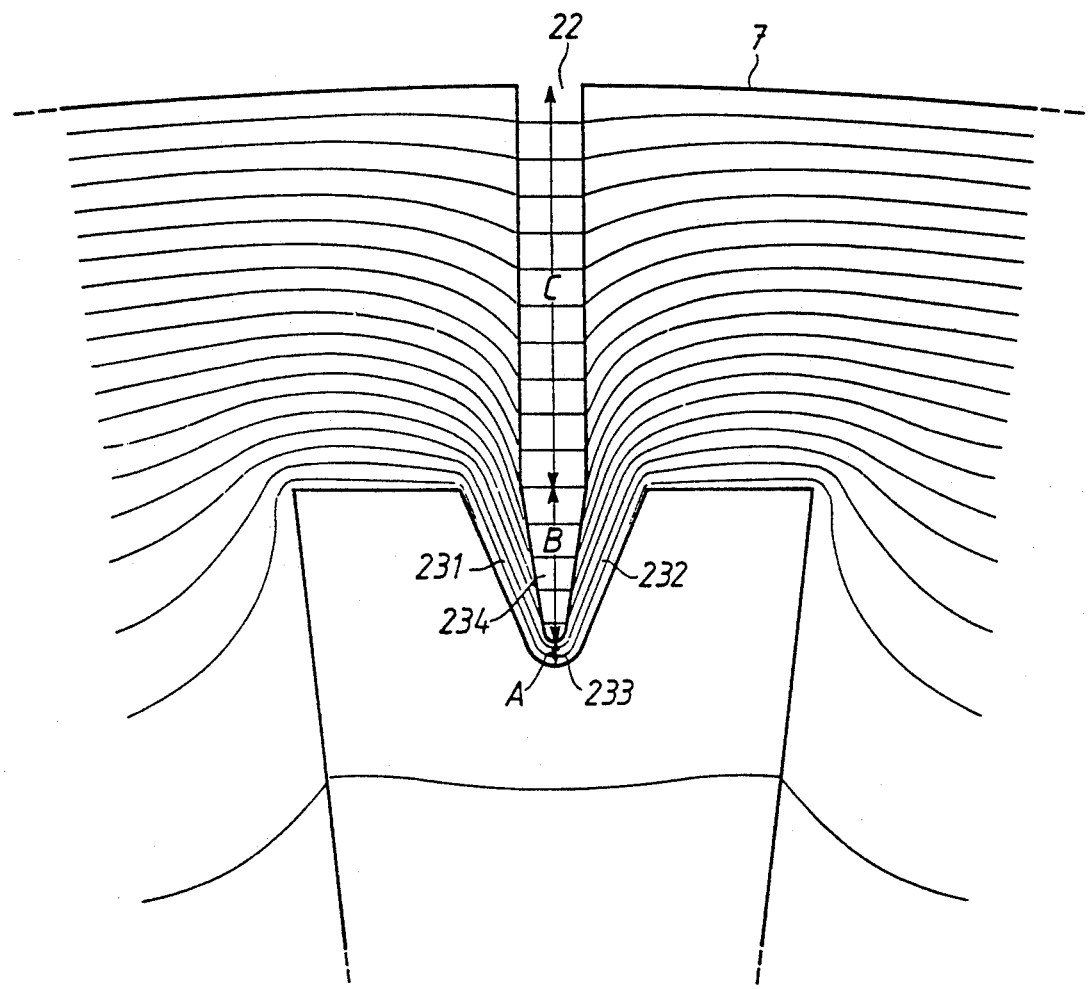
FIG. 3 shows the field plot for the leakage field at rated current of the machine according to FIGS. 1 and 2.

A motor according to the invention may have 28 motor conductors and otherwise the following data:
rated voltage 380 V
rated current 155 A
rated speed 9000 rpm
rated power 80 kW
rotor diameter 211 mm Further, it may have the following values for the dimensions shown in FIG. 2:
d = 1.7 mm
b = 1.8 mm
a = 0.5 mm
h = 4.0 mm
B = 11 mm FIG. 3 shows the field plot for the leakage field of the machine at rated current. The bridge 23 shunts the leakage flux past that part of the slot opening 22 which faces the rotor conductor and effectively prevents the flux from penetrating into the rotor conductor and causing additional losses there. The material in that part of the rotor core which is located between the rotor slot and the rotor surface 7 is unsaturated, even at full current of the motor. On the other hand, the material in the bridge 23 achieves saturation even at a low motor current, whereupon the leakage flux will flow partly through the space 234 between the two branches of the bridge (B in FIG. 3) and partly through the main portion of the slot opening 22 (C in FIG. 3). The shape and the dimensions of the two branches of the bridge and of the space between the branches are so chosen that the material in the entire bridge 23 achieves magnetic saturation approximately simultaneously at the above-mentioned low value of the load current of the motor. The width a of the bridge nearest its tip 233 is suitably made as small as possible. Reasons of manufacturing and for strength, however, this width cannot be reduced to below a certain value, for example 0.5 mm. A certain part of the leakage flux will therefore also traverse the tip of the bridge (region A in FIG. 3).

Figure 4:
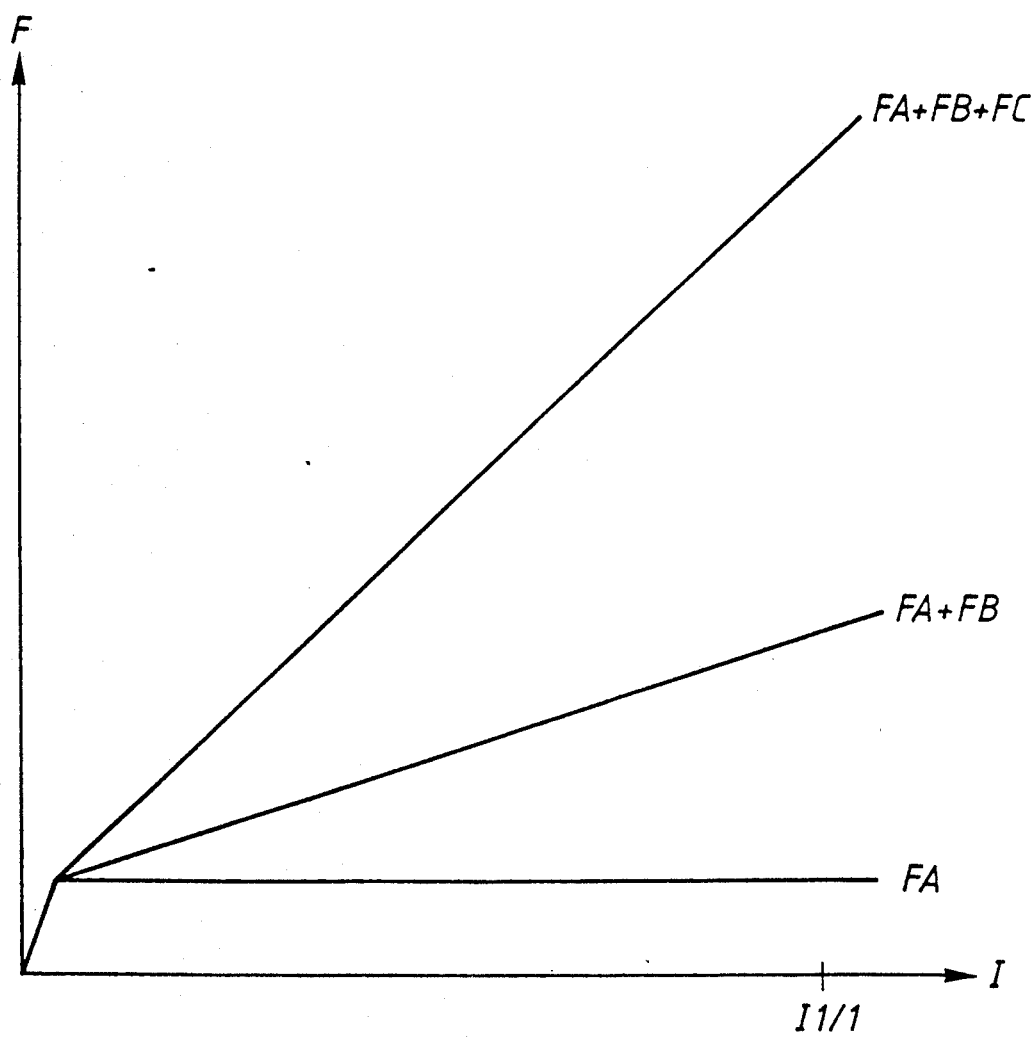
FIG. 4 shows the leakage flux as a function of the load current of the motor.

FIG. 4 shows the leakage flux F of the rotor as a function of the load current I of the motor. The rated current of the motor is designated I 1/1. The flux component FA designates that part of the leakage flux which traverses the tip 233 of the bridge (region A). Since the bridge is dimensioned such that its material becomes magnetically saturated even at a low load current of the motor, the flux component FA increases rapidly to a saturation value and thereafter remains constant at an increasing load current I. The flux component which flows through the region B between the branches of the bridge is designated FB and grows linearly with the load current I. FIG. 4 shows that flux component which is made up of the sum of the components FA and FB. The flux component flowing through the actual slot opening 22 is designated FC. The curve FA + FB + FC in FIG. 4 shows the sum of the three flux components just mentioned, that is the total leakage flux. As will be clear from FIG. 4, the total leakage flux is a near by linear function of the load current of the motor. At a certain given leakage reactance (which is limited in the upward direction by the demands for the maximum torque of the motor), a differential reactance is therefore obtained which is as high as possible at a motor load in the vicinity of the rated load of the motor. Since it is the differential leakage reactance that limits the harmonic currents, a very good limitation of these currents is obtained in the machine according to the invention, and hence a limitation of the additional losses of the machine. For these reasons, a motor according to the invention is especially well suited for operation of objects having a constant load torque, for example compressors.

In a motor of the kind described here it is important that the slot openings 22 are free from conductor material, since otherwise very high additional losses would be generated in the conductor material present at these openings.

The embodiment of a machine according to the invention as described above provides several important advantages as compared with prior art motors for frequency convertor operation:

a) The bridge 23 effectively prevents the molten conductor material, in the manufacture of a squirrel cage by casting, from penetrating into the slot opening, causing additional losses there.

b) By the extra flux paths which are created through the tip of the bridge (A in FIG. 3) and through the region between the branches of the bridge (B in FIG. 3), an increase of the leakage reactance of the rotor, and hence a reduction of harmonic currents and additional losses, is obtained. The good linearity of the leakage flux as a function of the load which is obtainable in a machine according to the invention contributes to this, which gives a high differential reactance at the working point.

c) The bridge 23 shunts the leakage flux past the slot opening and therefore effectively shields the rotor conductor from the leakage flux. In this way, the eddy current losses in the conductor material, which otherwise occur at high frequencies, are effectively prevented, and the effective rotor resistance for the harmonics is greatly reduced.

d) Since the rotor conductor along its entire circumference, also at the slot opening, makes contact with the rotor sheets, a more efficient removal of heat losses from the rotor conductors is obtained than in prior art machines of a similar kind. This improved cooling is particularly advantageous in high-speed motors in which, in order to reduce the ventilation losses, the slot openings 22 must be closed nearest the air gap so that the rotor is given a smooth surface and in which, consequently, no significant cooling via the slot opening may take place.

The motor described above is only an example of how a motor may be designed according to the invention. The invention can be applied with advantage to both small and large motors and to motors for both low and very high speeds.

Figure 5A:
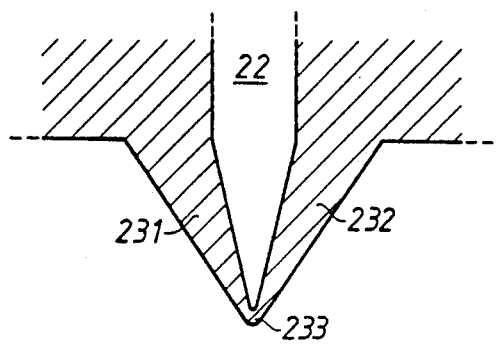
FIGS. 5a-5f show alternative embodiments of the bridge according to the invention.

The embodiment of the bridge 23 described above is also just an example and a plurality of other embodiments are feasible. FIGS. 5a–5f show a few examples of other feasible embodiments. FIG. 5a shows a theoretically advantageous embodiment, in which both the outsides and the insides of the branches 231 and 232 are straight and converge at a point at the tip 233 of the bridge. For embodiments, in which the width of the bridge is constant along the length of the bridge. These embodiments are usable in practice and afford advantages compared with prior art machines, but compared with the embodiments according to FIGS. 1–3 and FIG. 5a, a less effective shielding of the flux from the rotor conductor and an inferior linearity are obtained, i.e. a lower differential reactance at rated load. FIG. 5d differs from FIG. 5f in that the height of the bridge (in a radial direction) is larger in the bridge according to FIG. 5f. This provides an enlargement of the additional flux path which is created between the branches of the bridge and thus, as mentioned above, a higher leakage reactance. It has been found that in order to obtain the advantages of the invention to a substantial extent, the height of the bridge (h in FIG. 2) should exceed the width of the slot openings (d in FIG. 2).

Figure 5E:
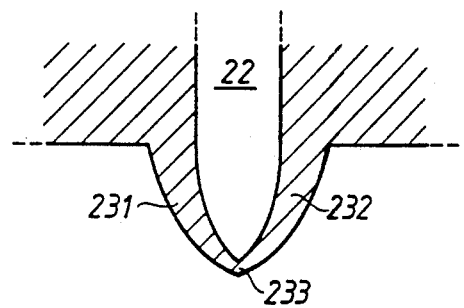

FIG. 5e shows a modification of FIG. 5a in which the sides of the bridge branches do not consist of straight lines but are somewhat curved.

Figure 5B:
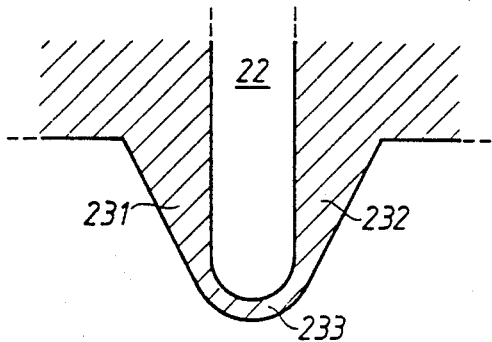
Figure 5F:
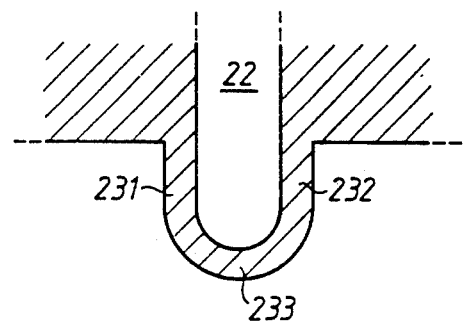
Figure 5C:
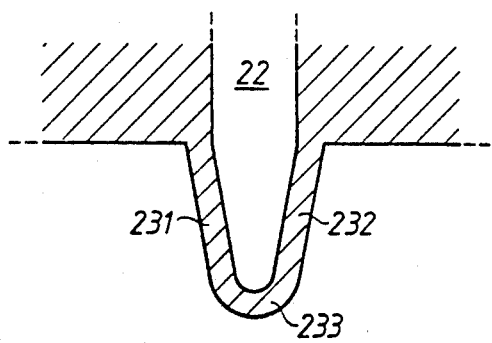
Figure 5D:
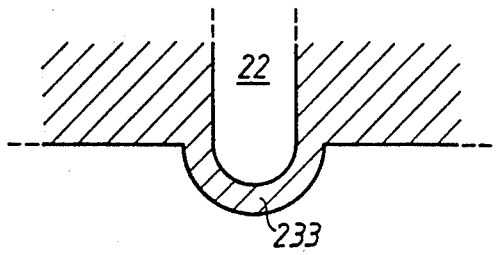

The bridges shown in FIGS. 1–3, 5a, 5c, 5e are V-shaped, that is, they have two non-parallel branches 231, 232 meeting at a more or less rounded tip 233. The bridge shown in FIG. 5f is U-shaped, that is, it has two essentially parallel branches 231, 232, connected by a central portion 233. The bridge shown in FIG. 5b is V-shaped and has a U-shaped recess.

The total width of the bridge (d +2b in FIG. 2) must be adapted to the individual motor in such a way that it is made so large that an effective shunting of the leakage flux past the slot opening is obtained, however not so large that a leakage flux of a significant magnitude occurs between the branches of the bridge and the radially directed edges of the rotor slot. In the embodiments described above, the bridge according to the invention forms part of the rotor sheet package. Alternatively, the bridge may consist of a separate part. In a bar-based rotor winding the bridge may, for example, be mounted on the rotor rod, for example glued thereto, and be inserted together with the rod into the rotor slot.

I claim:

1. A squirrel-cage induction motor for frequency convertor operation comprising a rotor having a rotor core with a plurality of substantially axially extending rotor slots, each rotor slot having a main portion in which a rotor conductor is arranged and a slot opening arranged between the main portion and that surface of the rotor which faces the air gap of the motor, and a structurally unified magnetic bridge arranged to completely separate the slot opening from the main portion of the slot, wherein ends of the magnetic bridge adjoin the rest of the rotor core on either side of the slot opening, and wherein the portion of the magnetic bridge opposite to the sheet openings extends into said main portion of the slot.

2. A squirrel-cage induction motor according to claim 1, wherein the width of the bridge is smaller at the central part of the bridge than at the ends of the bridge.

3. A squirrel-cage induction motor according to claim 2, wherein the width of the bridge decreases continuously from the ends towards the central part.

4. A squirrel-cage induction motor according to claim 1, wherein the ratio between the height of the bridge and the width of the slot opening is greater than 1.

5. A squirrel-cage induction motor according to claim 1, wherein the bridge is provided with a recess which forms an extension of the slot opening towards the interior of the rotor conductor.

6. A squirrel-cage induction motor according to claim 5, wherein the width of the recess decreases from the slot opening in a direction towards the rotor conductor.

7. A squirrel-cage induction motor according to claim 6, wherein the width of the recess decreases continuously from the slot opening in a direction towards the rotor conductor.

8. A squirrel-cage induction motor according to claim 5, wherein the bridge is U- or V-shaped with two branches, arranged on each side of the center of the bridge, said branches forming between them said recess.

9. A squirrel-cage induction motor according to any of claim 1 wherein the slot opening is free from conducting materials.

10. A squirrel-cage induction motor according to claim 3, wherein the ratio between the height of the bridge and the width of the slot opening is greater than 1.

11. A squirrel-cage induction motor according to claim 4, wherein the bridge is provided with a recess which forms an extension of the slot opening towards the interior of the rotor conductor.

12. A squirrel-cage induction motor according to claim 6, wherein the bridge is U- or V-shaped with two branches arranged on each side of the center of the bridge, said branches forming between them said recess.

13. A squirrel-cage induction motor according to claim 7, wherein the bridge is U- or V-shaped with two branches arranged on each side of the center of the bridge, said branches forming between them said recess.

14. A squirrel-cage induction motor for frequency convertor operation comprising a rotor having a rotor core with a plurality of substantially axially extending rotor slots, each rotor slot having a main portion in which a rotor conductor is arranged and a slot opening arranged between the main portion and that surface of the rotor which faces the air gap of the motor, and a magnetic bridge arranged to separate the slot opening from the main portion of the slot, wherein ends of the magnetic bridge adjoin the rest of the rotor core on either side of the slot opening, and wherein said magnetic bridge has an inner surface, which faces the rotor conductor that is U- or V-shaped with its vertex protruding towards the rotor conductor in said main portion.

15. A squirrel-cage induction motor according to claim 14, wherein the slot opening is free from conducting materials.

* * * * *